United States Patent [19]

Saito

[11] Patent Number: 5,281,262
[45] Date of Patent: Jan. 25, 1994

[54] AQUEOUS PIGMENT INK COMPOSITION FOR BALL-POINT PENS

[75] Inventor: Mizue Saito, Yamato, Japan

[73] Assignee: Mitsubishi Pencil Kabushiki Kaisha, Tokyo, Japan

[21] Appl. No.: 928,943

[22] Filed: Aug. 11, 1992

[30] Foreign Application Priority Data

Aug. 21, 1991 [JP] Japan ................................. 3-232499
Aug. 21, 1991 [JP] Japan ................................. 3-232500
Aug. 21, 1991 [JP] Japan ................................. 3-232501

[51] Int. Cl.$^5$ ............................................. C09D 11/18
[52] U.S. Cl. ..................................................... 106/20 R
[58] Field of Search ........................... 106/20 R, 23 R

[56] References Cited

U.S. PATENT DOCUMENTS

| | | | |
|---|---|---|---|
| 4,431,450 | 2/1984 | Hasegawa et al. | 106/23 R |
| 4,545,818 | 10/1985 | Inoue et al. | 106/23 F |
| 4,986,850 | 1/1991 | Iwata et al. | 106/25 R |

FOREIGN PATENT DOCUMENTS

| | | |
|---|---|---|
| 55-106273 | 8/1980 | Japan . |
| 62-10547 | 1/1982 | Japan . |
| 63-234073 | 9/1988 | Japan . |

*Primary Examiner*—Helene Klemanski
*Attorney, Agent, or Firm*—Darby & Darby

[57] ABSTRACT

The present invention provides an aqueous pigment ink for ball-point pen which can inhibit surface tension from extremely deteriorating to protect written letters from blur and which is excellent in non-drying properties and which has lubricating properties enough to smoothly rotate a ball and to decrease friction of a ball seat, whereby a writing performance can be remarkably improved and a comfortable writing performance can be given.

The aqueous pigment ink composition for ball-point pens of the present invention is characterized by comprising a pigment, a dispersant, water and an adduct of at least one polyhydric alcohol with an alkylene oxide, the polyhydric alcohol being selected from the group consisting of polyglycerin, glycerin, trimethylolpropane and a mixture thereof.

8 Claims, No Drawings

AQUEOUS PIGMENT INK COMPOSITION FOR BALL-POINT PENS

BACKGROUND OF THE INVENTION (1) Field of the Invention

The present invention relates to an aqueous pigment ink composition. Particularly, it relates to an aqueous pigment ink composition suitable for ball-point pens.

(2) Description of the Related Art

In a conventional aqueous pigment ink for a ball-point pen, a pigment is dispersed as a coloring agent, and water or a water-soluble solvent such as glycol or glycerin is used as a solvent which is the main component for inhibiting the ink from drying (non drying properties) at the tip of the ball-point pen. However, such a conventional ink is poor in lubricating properties, so that frictional resistance between a ball and a ball seat is large when the ball is rotated at the time of writing, and thus, there are the following drawbacks. That is, the ball seat is worn and the ball retracts, and the ball is loose or the flow of the ink is not uniform, with the results that the writing performance noticeably declines. For the purpose of removing these drawbacks, it has been attempted to add a lubricating improver such as an unsaturated fatty acid or potassium oleate.

On the other hand, Japanese Patent Application Laid-open No. 63-234073 discloses an ink for a ball-point pen containing a dye and an adduct of polyglycerin with ethylene oxide, and Japanese Patent Application Laid-open No. 55-106273 discloses an aqueous ink composition for a ball-point pen containing a dye, an adduct of sorbitol or glycerin with polyoxyalkylene and a fluorine surface active agent. In both the publications, it is described that these inks for the ball-point pens are excellent in lubricating properties and have a smooth writing performance. However, when the dye is used together with the adduct of the alkylene oxide, the lubricating properties are excellent but there is a drawback that the ink tends to blur. Furthermore, Japanese Published Patent Application No. 62-10547 discloses a recording liquid suitable for an ink jet recording system containing an adduct of glycerin with alkylene oxide. However, when the recording liquid is used for the ball-point pen, there are drawbacks that the lubricating properties are not always satisfactory and that the dispersion of a pigment is not good.

SUMMARY OF THE INVENTION

In the case of the above-mentioned conventional methods, sufficient lubricating properties cannot be obtained, and a writing impossible phenomenon takes place owing to the wear of a ball seat. In addition, some practical problems are also perceived. That is, even if enough lubricating properties can be obtained, the surface tension of an ink noticeably deteriorates, and so the written letters easily blur.

An object of the present invention is to provide an aqueous pigment ink for ball-point pens which can inhibit surface tension from extremely deteriorating to protect written letters from blur and which is excellent in non-drying properties and which has enough lubricating properties to smoothly rotate a ball and to decrease friction on a ball seat, whereby writing performance can be remarkably improved and a comfortable writing performance can be given.

The present inventors have intensively researched to solve the above-mentioned problems, and as a result, they have found that when an adduct of a specific polyhydric alcohol with an alkylene oxide is added to a pigment ink composition, the above-mentioned object can be accomplished. Thus, the present invention has been completed on the basis of this knowledge.

An aqueous pigment ink composition for ball-point pens of the present invention is characterized by comprising a pigment, a dispersant, water and at least one adduct of one polyhydric alcohol with an alkylene oxide selected from the group consisting of an adduct of polyglycerin with an alkylene oxide, an adduct of glycerin with an alkylene oxide in which 1 to 150 mols of the alkylene oxide are added to 1 mol of glycerin, an adduct of trimethylolpropane with an alkylene oxide, and a mixture thereof. The amount of the adduct of polyhydric alcohol with the alkylene oxide is in the range of 0.5 to 40% by weight with respect to the total weight of the composition.

The first aqueous pigment ink composition for ball-point pens of the present invention is characterized by comprising a pigment, a dispersant, water and an adduct of polyglycerin with an alkylene oxide.

The preferable example of this ink composition is an aqueous pigment ink composition which comprises 0.5 to 40% by weight of an adduct of polyglycerin with an alkylene oxide in which 1 to 60 mols of the alkylene oxide are added to 1 mol of polyglycerin having a degree of polymerization of 2~4, 2 to 30% by weight of a pigment, 0.1 to 10% by weight of a dispersant, and 40 to 90% by weight of water with respect to the total weight of the composition.

The second aqueous pigment ink composition for ball-point pens of the present invention is characterized by comprising a pigment, a dispersant, water and an adduct of glycerin with an alkylene oxide in which 1 to 150 mols of the alkylene oxide are added to 1 mol of glycerin.

The preferable example of this ink composition is an aqueous pigment ink composition which comprises 0.5 to 40% by weight of an adduct of glycerin with an alkylene oxide, 2 to 30% by weight of a pigment, 0.1 to 10% by weight of a dispersant, and 40 to 90% by weight of water with respect to the total weight of the composition.

The third aqueous pigment ink for ball-point pens of the present invention is characterized by adding an adduct of trimethylolpropane with an alkylene oxide to an aqueous pigment ink mainly comprising a pigment, a dispersant, a water-soluble solvent and water.

The preferable example of this ink composition is an aqueous pigment ink composition which comprises 0.5 to 40% by weight of an adduct of trimethylolpropane with an alkylene oxide in which 1 to 60 mols of the alkylene oxide are added to trimethylolpropane, 2 to 30% by weight of a pigment, 0.1 to 10% by weight of a dispersant, and 40 to 90% by weight of water with respect to the total weight of the composition.

DETAILED DESCRIPTION OF PREFERRED EMBODIMENTS

An adduct of polyglycerin with an alkylene oxide which is used in a composition of the present invention is an adduct in which 1 to 60 mols of an alkylene oxide are added to polyglycerin having the degree of polymerization of 2~4, such as diglycerin and triglycerin. For example, such an adduct can be obtained by adding 1 to 60 mols of ethylene oxide, propylene oxide or a mixture thereof to a polymer containing 1 mol of polyglycerin having the degree of polymerization of 2~4, and the content of the adduct of the polyglycerin with the alkylene oxide is preferably from 0.5 to 40% by weight, more preferably from 1 to 30% by weight based on the total weight of the composition. When the content of the adduct is less than 0.5% by weight, sufficient lubricating properties cannot be obtained and so the improvement of a writing performance cannot be expected. Conversely, when it is more than 40% by weight, the viscosity of the ink increases and the flow of the ink is poor and improper.

The adduct of glycerin with the alkylene oxide which is used in the ink composition of the present invention is an adduct in which 1 to 150 mols of the alkylene oxide are added to glycerin. For example, such an adduct can be obtained by adding 1 to 150 mols of ethylene oxide, propylene oxide or a mixture thereof to glycerin. The content of the adduct of glycerin with the alkylene oxide is preferably from 0.5 to 40% by weight, more preferably from 1 to 30% by weight based on the weight of the composition.

When the content of the adduct is less than 0.5% by weight, sufficient lubricating properties cannot be obtained and so the improvement effect of a writing performance cannot be expected. Conversely, when it is more than 40% by weight, the viscosity of the ink increases and the flow of the ink is poor and improper.

The adduct of trimethylolpropane with the alkylene oxide which is used in the ink composition of the present invention is an adduct in which 1 to 60 mols of the alkylene oxide are added to trimethylolpropane. For example, such an adduct can be obtained by adding 1 to 60 mols of ethylene oxide, propylene oxide or a mixture thereof to trimethylolpropane. The content of the adduct of trimethylolpropane with the alkylene oxide is preferably from 0.5 to 40% by weight, more preferably from 1 to 30% by weight based on the weight of the composition.

When the content of the adduct is less than 0.5% by weight, sufficient lubricating properties and the improvement effect of a writing performance cannot be expected. Conversely, when it is more than 40% by weight, the viscosity of the ink increases and the flow of the ink is poor and improper.

The adduct of the specific polyhydric alcohol with the alkylene oxide in the ink composition of the present invention is prepared from alkylene oxide and the specific polyhydric alcohol in an alkali-catalyzed reaction in the presence of excess alkylene oxide.

This reaction proceeds such that firstly the alkylene oxide reacts with the specific polyhydric alcohol and then further polymerization of alkylene oxide proceeds.

That is, in a pressure vessel, the inner atmosphere of which is previously replaced with nitrogen, is placed the specific polyhydric alcohol and alkali and then the alkylene oxide is added thereto dropwise at a pressure of about 10 kg/cm$^2$ and a temperature of 100~140° C.

In the ink composition of the present invention, the adduct of the specific polyhydric alcohol with the alkylene oxide may be mixed with a water-soluble organic solvent. Examples of this solvent include water-soluble polyhydric alcohols such as ethylene glycol, propylene glycol, diethylene glycol and glycerin; cellosolves such as ethylene glycol monomethyl ether (methyl cellosolve) and ethylene glycol monoethyl ether (ethyl cellosolve); carbitols such as diethylene glycol monomethyl ether (methyl carbitol) and diethylene glycol monoethyl ether (ethyl carbitol); and glycol ether esters such as ethylene glycol monoethyl ether acetate. These compounds can improve the non-drying properties.

The amount of the solvent to be blended is usually 40% by weight or less, preferably from 5 to 40% by weight based on the total weight of the composition.

No particular restriction is put on the kind of pigment which can be used in the ink composition of the present invention, and optional inorganic and organic pigments can be used which have been conventionally employed in the aqueous pigment ink composition. Examples of this inorganic pigment include titanium oxide, carbon black and metal powders; and examples of the above-mentioned organic pigment include azo lakes, insoluble azo pigments, chelate azo pigments, phthalocyanine pigments, perylenes, perylene pigments, anthraquinone pigments, quinacridone pigments, dye lakes, nitro pigments and nitroso pigments.

Typical usable examples of the pigment include Phthalocyanine Blue (C.I. 74260), Phthalocyanine Green (C.I. 74260), Hansa Yellow 3G (C.I. 11670), Disazo Yellow GR (C.I. 21100), Permanent Red 4R (C.I. 12335), Brilliant Carmine 6B (C.I. 15850) and Quinacridone Red (C.I. 46500).

These pigments may be used singly or in a combination of two or more, and the amount of the pigment to be used is usually from 2 to 30% by weight, preferably from 5 to 15% by weight based on the total weight of the composition.

The dispersant in the composition of the present invention adheres to the surfaces of pigment particles and permits the pigment to be dispersed in water. Examples of the usable dispersant include nonionic and anionic surface active agents and water-soluble polymers, and the latter water-soluble polymers are preferably used. Examples of the nonionic surface active agents include polyoxyalkylene higher fatty esters, higher fatty acid partial esters of polyhydric alcohols and higher fatty esters of saccharide.

Typical examples of the nonionic surface active agents include fatty esters of glycerin, polyglycerin fatty esters, propylene glycol fatty esters, pentaerythritol fatty esters, polyoxyethylene sorbitan fatty acid esters, polyoxyethylene sorbit fatty esters, polyoxyethylene glycerin fatty esters, polyethylene glycol fatty esters, polyoxyethylene alkylene ethers, polyoxyethylene phytosterols, polyoxyethylene polyoxypropylenealkyl ethers, polyoxyethylenealkylphenyl ethers, polyoxyethylenecastor oil, polyoxyethylenelanolin, polyoxyethylenelanolin alcohol, polyoxyethylenealkylamine, polyoxyethylene fatty acid amides and polyoxyethylenealkylphenyl formaldehyde condensates.

Examples of the anionic surface active agent include alkylated sulfonates of higher fatty acid amides and alkylallyl sulfonates, and typical examples thereof include alkyl sulfates, polyoxyethylene alkyl ether sulfates, salts of N-acyl amino acid, salts of N-acylmethyltaurine, polyoxyethylene alkyl ether acetates, alkyl phosphates and polyoxyethylene alkyl ether phosphates.

Examples of the water-soluble polymers include polyacrylic acid, acrylic copolymers and maleic resins.

Typical examples of the water-soluble polymers include water-soluble salts of resins such as an acrylic resin, a styrene-acrylic resin and a styrene-maleic resin. Typical examples of alkaline metals for the formation of the salts are sodium and potassium. Examples of the amine include aliphatic primary, secondary and tertiary amines such as mono-, di- and trimethylamines; alcoholamines such as mono-, di- and tripropanolamines, methyl ethanolamine, methyl propanolamine and dimethyl ethanolamine; ammonia, morpholine and N-methylpholine.

The amount of the dispersant to be blended is from 0.1 to 10% by weight based on the weight of the composition.

No particular restriction is put on the amount of water which is used in the composition of the present invention, but it is suitably from 40 to 90% by weight based on the weight of the composition.

In addition, if necessary, there may be blended a lubricant such as potassium linoleate or sodium ricinoleate, potassium oleate or sodium oleate; an antiseptic agent such as phenol or sodium benzoate; a rust preventive such as benzotriazole, dicyclohexyl ammonium nitrite or diisopropyl ammonium nitrite; and a pH adjustor such as triethanolamine, monoethanolamine, diethanolamine or ammonia.

The ink composition of the present invention is excellent in lubricating properties and can improve a writing performance. Its functional mechanism is not clearly definite but can be presumed as follows: The oxygen atoms in the hydroxyl group and the ether bond portion in the structure of the adduct of the specific polyhydric alcohol with the alkylene oxide used in the present invention adhere to the surface of the metal, and hydrocarbon chains are arranged on the side opposite to the metal surface. Then, the adduct itself of the specific polyhydric alcohol with the alkylene oxide is viscous, and so a lubricating film is formed between a ball and a ball seat, whereby the lubricating properties are given.

It can be also supposed that the ink composition of the present invention provides the good lubricating properties with less blur owing to the suitable viscosity of glycerin or the polymeric chain of ethylene oxide in the adduct of the specific polyhydric alcohol with the alkylene oxide and owing to the function of the dispersant.

Additionally, in the ink in which the adduct of the specific polyhydric alcohol with the alkylene oxide is used, the dye easily blurs but the pigment scarcely blurs, and this reason is not apparent but can be presumed to be due to different solubilities of the dye and the pigment in the solvent.

The aqueous pigment ink composition for ball-point pens of the present invention, when used in a ball-point pen, scarcely blurs and gives good lubricating properties, so that the friction on a ball seat attributable to the rotation of a ball is controlled. Thus, the proper flow of the ink can be maintained and smooth writing feeling can be given.

Furthermore, the ink is inhibited from drying at the tip of the ball-point pen, and so the effect of less scratch can be exerted.

Moreover, when the aqueous pigment ink composition of the present invention is used, the drying up of the ink at a pen tip and an orifice tip can be inhibited, and clogging can be prevented and the blur of written letters can be also controlled. In consequence, the aqueous pigment ink composition of the present invention is also very desirable as an ink for ink jet.

EXAMPLES

Now, the present invention will be described in more detail in reference to examples, but the present invention should not be limited to these examples.

Inks of Examples 1 to 6 and Comparative Examples 1 to 6 were obtained by stirring and mixing components in a stirring machine for 3 hours, dispersing the mixture by a sand mill for 5 hours, and then removing coarse particles therefrom by a centrifugal separator.

Dye inks of Comparative Examples 7 and 8 were obtained by stirring components at a temperature of 40 to 60° C. for 1 hour, cooling and then filtering the mixture.

The inks obtained in the examples and comparative examples were evaluated by the following writing test. The results are set forth in Table 1.

In the writing test, the measurement of a ball dent as well as the evaluation of a writing performance and the blur state of the written letters were carried out as follows.

Ball Dent

After writing was made as much as 500 m under conditions of a writing angle of 60°, a writing rate of 5.5 m/minute and a load of 100 g by a helical writing tester, the deep of the worn portion of a ball seat, i.e., the decreased length of the ball projecting from a holder was measured.

Writing performance

○: Smooth and stable writing performance
△: Scraggy and hard writing performance
x: Scraggy and hard writing performance, and presence of line cut and directional property Blur of written letters ○: Clear written letters without blur
△: Unclear written letters with blur
x: Very unclear written letters with noticeable blur

EXAMPLE 1

A black aqueous pigment ink for ball-point pens was prepared from the following components.

| | |
|---|---|
| Carbon black MA 100 [particle size 22 μm, oil absorption 100 ml/100 g (DBP), specific surface area 134 m$^2$/g (BET), made by Mitsubishi Kasei Co., Ltd.] | 8.0 wt % |
| Ethylene glycol | 10.0 wt % |
| Adduct of 1 mol of diglycerin with 30 mols of ethylene oxide (viscosity 348 cps, hydroxyl value 15 mg$_{KOH}$/g) | 5.0 wt % |
| Ammonium salt of styrene acrylic acid resin | 3.0 wt % |
| Potassium linoleate | 0.3 wt % |
| Triethanolamine | 0.5 wt % |
| Phenol | 0.1 wt % |
| Benzotriazole | 0.1 wt % |
| Purified water | 73.0 wt % |
| Total | 100.0 wt % |

Above-mentioned Ammonium salt was prepared by neutralizing Styrene-Acrylic acid Copolymer having weight-average molecular weight of 10000, acid value of 195, softening point of 143° C., and glass transition point of 70° C., with ammonia.

EXAMPLE 2

A blue aqueous pigment ink for ball-point pens was prepared from the following components.

| | |
|---|---|
| Phthalocyanine blue (Chromofine blue 4965, made by Dainichiseika Co., Ltd.) | 8.0 wt % |
| Glycerin | 5.0 wt % |
| Adduct of 1 mol of triglycerin with 20 mols of propylene oxide | 10.0 wt % |
| Ammonium salt of styrene maleate resin | 3.0 wt % |
| Sodium ricinoleate | 0.3 wt % |
| Triethanolamine | 0.5 wt % |
| Phenol | 0.1 wt % |
| Benzotriazole | 0.1 wt % |
| Purified water | 73.0 wt % |
| Total | 100.0 wt % |

COMPARATIVE EXAMPLE 1

The same procedure as in Example 1 was repeated except that 5.0 wt % of an adduct of glycerin with 30 mols of ethylene oxide and 10.0 wt % of ethylene glycol were replaced with 15% of ethylene glycol, to obtain a black aqueous pigment ink.

COMPARATIVE EXAMPLE 2

The same procedure as in Example 2 was repeated except that 10.0% of an adduct of 1 mol of triglycerin with 20 mols of propylene oxide and 5.0% of glycerin were replaced with 15% of glycerin and that 0.5% of sodium ricinoleate and 72.8% of purified water were used, to obtain a blue aqueous pigment ink.

EXAMPLE 3

A blue aqueous pigment ink for ball-point pens was obtained by the use of the following components. The results of a writing test are set forth in Table 1.

| | |
|---|---|
| Phthalocyanine blue (Chromofine blue 4965, made by Dainichiseika Co., Ltd.) | 7.0 wt % |
| Ethylene glycol | 17.0 wt % |
| Adduct of 1 mol of glycerin with 40 mols of ethylene oxide | 3.0 wt % |
| Ammonium salt of styrene acrylate resin (used in Example 1) | 3.0 wt % |
| Potassium linoleate | 0.3 wt % |
| Triethanolamine | 0.5 wt % |
| Phenol | 0.1 wt % |
| Benzotriazole | 0.1 wt % |
| Purified water | 69.0 wt % |
| Total | 100.0 wt % |

EXAMPLE 4

A black aqueous pigment ink for ball-point pens was obtained by the use of the following components. The results of a writing test are set forth in Table 1.

| | |
|---|---|
| Carbon black MA 100 (made by Mitsubishi Kasei Co., Ltd.) | 8.0 wt % |
| Glycerin | 5.0 wt % |
| Adduct of 1 mol of glycerin with 10 mols of propylene oxide | 5.0 wt % |
| Ammonium salt of styrene maleate resin | 3.0 wt % |
| Sodium ricinoleate | 0.3 wt % |
| Triethanolamine | 0.5 wt % |
| Phenol | 0.1 wt % |
| Benzotriazole | 0.1 wt % |
| Purified water | 78.0 wt % |
| Total | 100.0 wt % |

COMPARATIVE EXAMPLE 3

The same procedure as in Example 3 was repeated except that an adduct of 1 mol of glycerin with 40 mols of ethylene oxide was replaced with ethylene glycol, to obtain a blue aqueous pigment ink. The results of a writing test are set forth in Table 1.

COMPARATIVE EXAMPLE 4

The same procedure as in Example 4 was repeated except that 5.0% of an adduct of glycerin with 10 mols of propylene oxide and 5.0% of glycerin were replaced with 10% by weight of glycerin and that 0.5% of sodium ricinoleate and 77.8% of purified water were used, to obtain a black aqueous pigment ink. The results of a writing test are set forth in Table 1.

EXAMPLE 5

A blue aqueous pigment ink for ball-point pens was obtained by the use of the following components. The results of a writing test are set forth in Table 1.

| | |
|---|---|
| Phthalocyanine blue (Chromofine blue 4965, made by Dainichiseika Co., Ltd.) | 7.0 wt % |
| Ethylene glycol | 17.0 wt % |
| Adduct of 1 mol of glycerin with 40 mols of ethylene oxide | 3.0 wt % |
| Polyoxyethylene (degree of polymerization of 10) nonyl phenylether, (Nicol NP-10 made by Nikko Chemicals Co., Ltd.; having hydrophile-lipophile balance of 16.5) | 3.0 wt % |
| Potassium linoleate | 0.3 wt % |
| Triethanolamine | 0.5 wt % |
| Phenol | 0.1 wt % |
| Benzotriazole | 0.1 wt % |
| Purified water | 69.0 wt % |
| Total | 100.0 wt % |

EXAMPLE 6

A red aqueous pigment ink for ball-point pens was prepared by the use of the following components. The results of a writing test are set forth in Table 1.

| | |
|---|---|
| Red pigment (RED K represented by the following formula, made by Fuji Dyestuff Co., Ltd.) | 8.0 wt % |

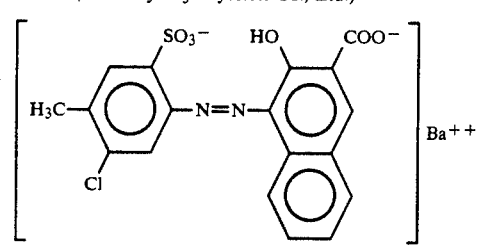

| | |
|---|---|
| Ethylene glycol | 30.0 wt % |
| Ammonium salt of styrene acrylate resin (used in Example 1) | 3.0 wt % |
| Potassium linoleate | 0.3 wt % |
| Adduct of 1 mol of trimethylolpropane with 5 mols of ethylene oxide | 2.0 wt % |
| Triethanolamine | 0.5 wt % |
| Phenol | 0.1 wt % |
| Benzotriazole | 0.1 wt % |
| Purified water | 56.0 wt % |
| Total | 100.0 wt % |

EXAMPLE 7

A black aqueous pigment ink for ball-point pens was prepared by the use of the following components. The results of a writing test are set forth in Table 1.

| Carbon black MA 100 (made by Mitsubishi Kasei Co., Ltd.) | 8.0 wt % |
|---|---|
| Glycerin | 10.0 wt % |
| Ammonium salt of styrene maleate resin | 3.0 wt % |
| Sodium ricinoleate | 0.3 wt % |
| Adduct of trimethylolpropane with 10 mols of propylene oxide | 1.5 wt % |
| Triethanolamine | 0.5 wt % |
| Phenol | 0.1 wt % |
| Benzotriazole | 0.1 wt % |
| Purified water | 76.5 wt % |
| Total | 100.0 wt % |

COMPARATIVE EXAMPLE 5

The same procedure as in Example 6 was repeated except that an adduct of 1 mol trimethylolpropane with 5 mols of ethylene oxide was omitted and 58% of purified water was used, to obtain a red aqueous pigment ink.

COMPARATIVE EXAMPLE 6

The same procedure as in Example 7 was repeated except that an adduct of 1 mol of trimethylolpropane with 10 mols of propylene oxide was omitted and that 0.5% of sodium ricinoleate and 77.8% of purified water were used, to obtain a black aqueous pigment ink.

COMPARATIVE EXAMPLE 7

A black aqueous pigment ink was obtained by the use of the following components. The results of a writing test are set forth in Table 1.

| C.I. Direct Black #19 | 5.0 wt % |
|---|---|
| Ethylene glycol | 10.0 wt % |
| Adduct of 1 mol of diglycerin with 30 mols of ethylene oxide | 5.0 wt % |
| Potassium linoleate | 0.3 wt % |
| Triethanolamine | 0.5 wt % |
| Phenol | 0.1 wt % |
| Benzotriazole | 0.1 wt % |
| Purified water | 79.0 wt % |
| Total | 100.0 wt % |

Above-mentioned Direct Black 19 is represented by the following formula.

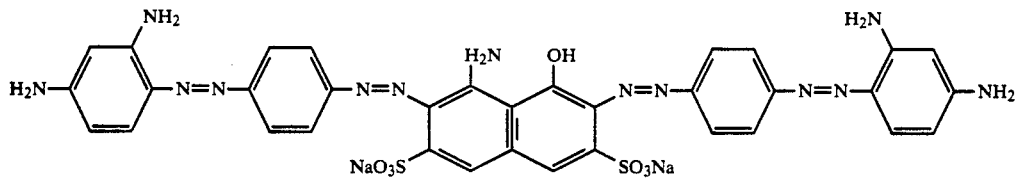

COMPARATIVE EXAMPLE 8

A blue aqueous dye ink was obtained by the use of the following components. The results of a writing test are set forth in Table 1.

| Blue No. 1 for food (C. I. Acid blue 9) | 6.0 wt % |
|---|---|

-continued

| Ethylene glycol | 17.0 wt % |
|---|---|
| Adduct of glycerin with 40 mols of ethylene oxide | 3.0 wt % |
| Potassium linoleate | 0.3 wt % |
| Triethanolamine | 0.5 wt % |
| Phenol | 0.1 wt % |
| Benzotriazole | 0.1 wt % |
| Anionic fluorine-based surface active agent | 0.01 wt % |
| Purified water | 72.99 wt % |
| Total | 100.0 wt % |

Above-mentioned Acid blue 9 is represented the following formula.

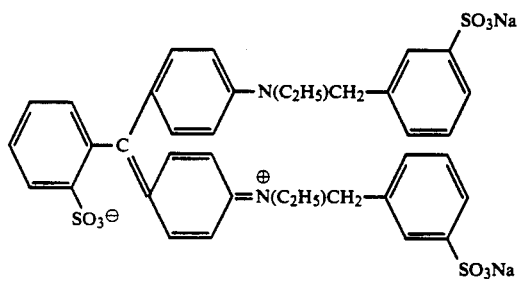

Next, inks obtained in Examples 1 to 7 and Comparative Examples 1 to 8 were used in ball-point pens, and a writing test was then carried out by the use of these ball-point pens to inspect a ball dent, a writing performance and a writing blur. The results of the test are set forth in Table 1.

TABLE 1

| | Ball Dent (μm) | Writing Performance | Blur of Written Letters |
|---|---|---|---|
| Example 1 | 6 | o | o |
| Comp. Ex. 1 | 30 | x | o |
| Example 2 | 8 | o | o |
| Comp. Ex. 2 | 16 | Δ | x |
| Example 3 | 8 | o | o |
| Comp. Ex. 3 | 25 | x | o |
| Example 4 | 5 | o | o |
| Comp. Ex. 4 | 20 | Δ | Δ |
| Example 5 | 6 | o | Δ |
| Example 6 | 6 | o | o |
| Comp. Ex. 5 | 45 | x | o |
| Example 7 | 8 | o | o |
| Comp. Ex. 6 | 22 | Δ | x |
| Comp. Ex. 7 | 6 | o | x |
| Comp. Ex. 8 | 8 | o | x |

As is apparent from the above-mentioned results, the aqueous pigment inks of the present invention have the considerably less ball dent, the smooth writing performance, and the less writing blur.

What is claimed is:

1. An aqueous pigment ink composition for ball-point pens, said ink comprising a pigment, a dispersant, water, and at least one adduct of polyhydric alcohol with an alkylene oxide selected from the group consisting of an adduct of polyglycerin with an alkylene oxide, an adduct of glycerin with an alkylene oxide in which 1 to 150 mols of the alkylene oxide are added to glycerin, an adduct of trimethylolpropane with an alkylene oxide, and a mixture thereof, wherein the about of the adduct of polyhydric alcohol with the alkylene oxide is in the range of 0.5 to 40% by weight with respect to the total weight of the composition, wherein the dispersant is at least one dispersant selected from the group consisting of water-soluble polymers, polyoxyalkylene higher fatty esters, higher fatty acid partial esters of polyhydric alcohols, alkylated sulfonates of higher fatty acid amides and alkylallyl sulfonates.

2. The aqueous pigment ink composition for ball-point pens according to claim 1 wherein the dispersant comprising a water soluble polymer.

3. An aqueous pigment ink composition for ball-point pens which comprises 0.5 to 40% by weight of an adduct of polyglycerin with the alkylene oxide in which 1 to 60 mols of the alkylene oxide are added to 2 to 4 mols of glycerin, 2 to 30% by weight of pigment, 0.1 to 10% by weight of dispersant, and 40 to 90% by weight of water with respect to the total weight of the composition, wherein the dispersant is at least one dispersant selected from the group consisting of water-soluble polymers, polyoxyalkylene higher fatty esters, higher fatty acid partial esters of polyhydric alcohols, alkylated sulfonates of higher fatty acid amines and alkylallyl sulfonates.

4. The aqueous pigment ink composition for ball-point pens according to claim 3 wherein the dispersant comprises a water-soluble polymer.

5. An aqueous pigment ink composition for ball-point pens which comprises 0.5 to 40% by weight of an adduct of glycerin with the alkylene oxide, 2 to 30% by weight of pigment, 0.1 to 10% by weight of dispersant, and 40 to 90% by weight of water with respect to the total weight of the composition, wherein the dispersant is at least one dispersant selected from the group consisting of water-soluble polymers, polyoxyalkylene higher fatty esters, higher fatty acid partial esters of polyhydric alcohols, alkylated sulfonates of higher fatty acid amides and alkylallyl sulfonates.

6. The aqueous pigment ink composition for ball-point pens according to claim 5 wherein the dispersant comprises a water soluble polymer.

7. An aqueous pigment ink composition for ball-point pens which comprises 0.5 to 40% by weight of an adduct of trimethylolpropane with an alkylene oxide in which 1 to 60 mols of the alkylene oxide are added to trimethylolpropane, 2 to 30% by weight of pigment, 0.1 to 10% by weight of dispersant, and 40 to 90% by weight of water with respect to the total weight of the composition, wherein the dispersant is at least one dispersant selected from the group consisting of water-soluble polymers, polyoxyalkylene higher fatty esters, higher fatty acid partial esters of polyhydric alcohols, alkylated sulfonates of higher fatty acid amides and alkylallyl sulfonates.

8. The aqueous pigment ink composition for ball-point pens according to claim 7 wherein the dispersant comprises a water-soluble polymer.

* * * * *